United States Patent [19]

Rhodes, III et al.

[11] Patent Number: 4,940,626

[45] Date of Patent: Jul. 10, 1990

[54] MELTBLOWN WIPER INCORPORATING A SILICONE SURFACTANT

[75] Inventors: Wayne T. Rhodes, III, Piedmont; Normand M. Savaria, Greer, both of S.C.

[73] Assignee: The James River Corporation, Va.

[21] Appl. No.: 199,351

[22] Filed: May 26, 1988

[51] Int. Cl.[5] .............................................. B32B 3/00

[52] U.S. Cl. .................................... 428/198; 428/288; 428/290; 428/340; 428/447

[58] Field of Search ............... 428/198, 288, 290, 447, 428/340

[56] References Cited

U.S. PATENT DOCUMENTS

| | | | |
|---|---|---|---|
| Re. 27,820 | 11/1973 | Politzer et al. | 156/62.4 |
| 3,520,016 | 7/1970 | Meitner | 15/209 |
| 3,546,056 | 4/1968 | Thomas | 156/85 |
| 3,650,882 | 3/1972 | Thomas | 156/209 |
| 3,704,198 | 10/1969 | Prentice | 428/290 |
| 3,870,567 | 3/1975 | Palmer et al. | 136/148 |
| 3,959,421 | 5/1976 | Weber et al. | 264/6 |
| 3,968,042 | 7/1976 | Erickson | 428/391 |
| 3,978,185 | 8/1976 | Buntin et al. | 264/93 |
| 4,020,212 | 4/1977 | Erickson | 428/361 |
| 4,165,352 | 8/1979 | Volkman | 264/113 |
| 4,184,004 | 1/1980 | Pines et al. | 428/413 |
| 4,264,645 | 4/1981 | von Bonin et al. | 427/55 |
| 4,307,143 | 12/1981 | Meitner | 252/91 |
| 4,379,192 | 4/1983 | Wahlquist et al. | 428/156 |
| 4,425,372 | 1/1984 | Baldwin | 427/2 |
| 4,426,417 | 1/1984 | Meitner et al. | 428/195 |
| 4,436,780 | 3/1984 | Hotchkiss et al. | 428/198 |
| 4,579,964 | 4/1986 | Totten et al. | 556/434 |
| 4,587,154 | 5/1986 | Hotchkiss et al. | 428/195 |
| 4,661,405 | 4/1987 | Greene et al. | 428/391 |

*Primary Examiner*—Marion C. McCamish

*Attorney, Agent, or Firm*—Finnegan, Henderson, Farabow, Garrett and Dunner

[57] ABSTRACT

A wiper comprising a meltblown polypropylene substrate containing a wetting agent. The preferred wetting agent is a functional organosilicone surfactant and the most preferred are DOW CORNING X2-8239 and UCARSIL ® EPS. The wiper can be manufactured at low cost, wipes well for both oil and water and has improved hydrophilicity and durability over prior art wipers.

13 Claims, 1 Drawing Sheet

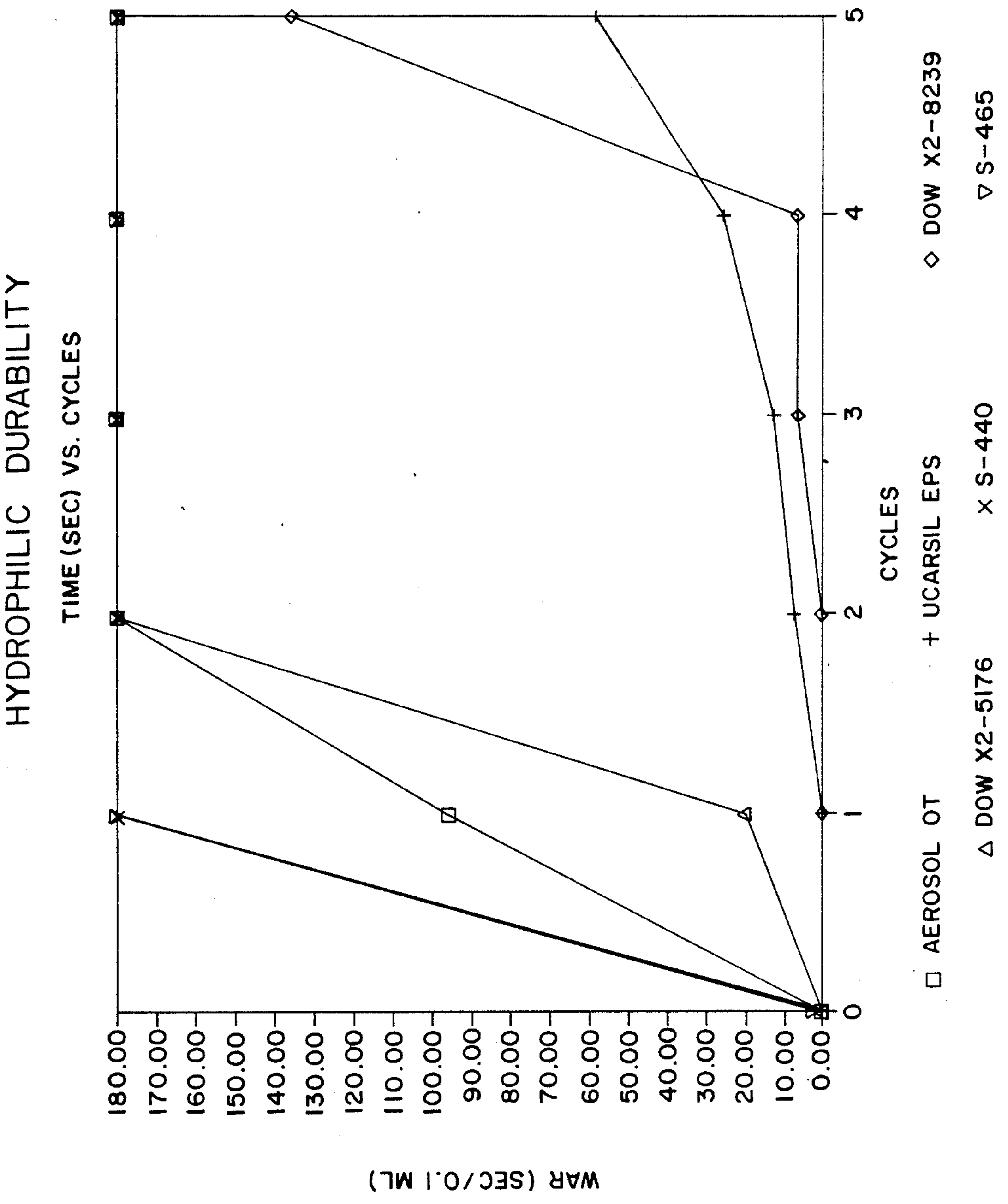
HYDROPHILIC DURABILITY
TIME (SEC) VS. CYCLES
WAR (SEC/0.1 ML)
180.00
170.00
160.00
150.00
140.00
130.00
120.00
110.00
100.00
90.00
80.00
70.00
60.00
50.00
40.00
30.00
20.00
10.00
0.00
0
1
2
3
4
5
CYCLES
□ AEROSOL OT
+ UCARSIL EPS
◇ DOW X2-8239
△ DOW X2-5176
× S-440
▽ S-465

MELTBLOWN WIPER INCORPORATING A SILICONE SURFACTANT

BACKGROUND OF THE INVENTION

The present invention relates to wipers for industrial and other applications involving the absorption of water, oil and other liquid materials. Such wipers can take the form of a fabric which can be used, for example, in maintenance shop, auto repair, and industrial facility cleanup, in hand wiping, and in any application in which it is desirable to have a single material that wipes well for both oil and water. Since wiping is, in most cases, performed by hand, it is desired to obtain a wiper that wipes clean with a minimum effort, preferably on the first application. Most paper wipers, while inexpensive, are only effective for a single use and then must be disposed. Cloth wipers, which are most often used in industrial applications, are expensive and therefore must be reused for economy, and also must be laundered. It is therefore desirable to obtain a low-cost wiper with high absorbability that is durable and thus can be used more than once and then disposed.

As disclosed in U.S. Pat. No. 4,307,143, many forms of wipers are available for various applications. In general, however, prior wipers can be classified as either paper or cloth. Paper wipers are inexpensive; however, they are suited primarily for use in wiping aqueous materials and are not entirely satisfactory for use with oil. Paper wipers also are primarily suitable for only a single use and then must be disposed. Cloth wipers, on the other hand, while suitable for wiping both oils and water, are expensive and must be laundered. In addition, unless care is taken in laundering, water absorption rates for cloth wipers can be adversely affected. Nonwoven wipers made from rayon, which may also include other ingredients such as pulp, for example, and other synthetic materials, have been available, but in general fail to provide good wiping properties with both oil and water and may entail a cost that prevents disposability except in special applications. Finally, both natural and synthetic sponges are in widespread use for wiping, but are even more expensive.

Examples of prior wipers within these broad classifications are contained in the following U.S. patents which are intended to be representative and not exhaustive: U.S. Pat. No. 3,477,084 to Thomas; U.S. Pat. No. 3,520,016 to Meitner; U.S. Pat. No. 3,546,056 to Thomas; U.S. Pat. No. 3,650,882 to Thomas; and U.S. Pat. No. Re. 27,820 to Politzer et al.

The preparation of polyolefin microfiber webs is also known and described in *Wente, Industrial and Engineering Chemistry,* Volume 48, No. 8 (1965), pp. 1342–1346, as well as U.S. Pat. No. 3,978,185 to Buntin et al., U.S. Pat. No. 3,795,571 to Prentice, U.S. Pat. No. 3,811,957 to Buntin, and U.S. Pat. No. 4,307,143 to Meitner. The Buntin et al. patent and the U.S. Pat. No. 4,307,143 to Meitner both disclose that meltblown polyolefins are useful as wiping cloths and hydrocarbon absorption material. However, the wipers as described in these publications each are deficient to a significant degree in one or more of the following properties: cost, combined oil and water wiping, clean wiping, physical properties, or durability.

It is an object of the present invention to provide a wiper that is inexpensive to produce.

It is another object of the present invention to provide a wiper that wipes well for both oil and water residues.

It is a further object of the present invention to provide a wiper that enables clean wiping by fully absorbing a liquid material on the first application.

It is a further object of the present invention to provide a wiper that has improved durability over paper wipers and thus can be reused.

It is a further object of the invention to provide a wiper that exhibits durable hydrophilicity, i.e., the wiper retains its absorbency after multiple uses.

Additional objects and advantages of the invention will be set forth in part in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, the present invention provides a wiper comprising a meltblown polypropylene substrate which incorporates a wetting agent capable of imparting durable hydrophilicity to the wiper.

In accordance with the invention, the preferred wetting agent applied to the meltblown polypropylene substrate is a functional organosilicone surfactant and most preferred is an aqueous solution of an organomethoxysiloxane, specifically Dow Corning X2-8239, or an aqueous solution of an epoxypolyoxyalkylene modified organosilicone, specifically UCARSIL® EPS.

The accompanying drawing, which is incorporated in and constitutes a part of this specification, together with the description, serves to explain the principles of the invention.

BRIEF DESCRIPTION OF THE DRAWING

The FIGURE is a graphical representation of the comparative hydrophilic durability test results presented in Table I.

DESCRIPTION OF THE PREFERRED EMBODIMENT

Reference will now be made in detail to the presently preferred embodiments of the invention.

In accordance with the present invention, the meltblown polypropylene substrate produced for the wipers of the present invention are manufactured in accordance with the process described in U.S. Pat. No. 3,978,185 to Buntin et al. which is incorporated herein by reference in its entirety. Briefly, the process involves extruding a fiber-forming thermoplastic polymer resin, polypropylene, in molten form through orifices of a heated nozzle into a stream of hot gas, such as water vapor, to attenuate the molten resin as fibers which form a fiber stream, the fibers being collected on a receiver in the path of the fiber stream to form a nonwoven mat.

In accordance with the invention, the meltblown polypropylene substrate preferably has a basis weight ranging from 1.0 to 4.0 oz. per square yard, preferably incorporates the wetting agent in an amount ranging from 0.1% to 2.0% by weight, preferably is formed from fibers having an average diameter less than 10 microns, e.g., ranging from 1 to 10 microns, and is preferably pattern bonded with a bond area coverage sufficient to provide adequate strength to maintain the utility of the wiper.

The meltblown polypropylene substrate of the wiper of the present invention preferably contains from 0.1% to 2.0% by weight of the wetting agent. The substrate should take up a sufficient amount of the surfactant wetting agent to provide the desired absorbency and durability. The solution of wetting agent applied to the substrate in the present invention is preferably an aqueous solution of a functional organosilicone present in an amount ranging from 0.75% to 3.0% by weight. Employing such concentrations will result in a satisfactory amount of the organosilicone wetting agent being taken up by the polypropylene substrate.

As utilized herein, the term functional organosilicone refers to an organosilicone containing a functional group.

The exact mechanism which enables retention of the wetting agent on the fiber surface is not critical to the invention. The mechanism is believed to consist of chemical bonding through active sites synthesized into the compounds as disclosed by U.S. Pat. No. 4,579,964 to Totten et al. and U.S. Pat. No. 4,184,004 to Pines et al. However, exemplary durability is obtained regardless of whether or not the polypropylene is capable of reacting with the organosilicone, perhaps through adsorption onto the fiber surface rendering the wetting agent resistant to leaching in aqueous solutions, or coating of the fibers with a network of self reacted or cross-linked surfactant which resists solubilization in aqueous solutions.

In accordance with the invention, the wetting agent applied to the meltblown polypropylene substrate is preferably a functional organosilicone surfactant, and most preferably is an organomethoxysiloxane, i.e., Dow Corning X2-8239, or an epoxypolyoxyalkylene modified organosilicone, i.e., UCARSIL® EPS.

UCARSIL® EPS is believed to be disclosed by U.S. Pat. No. 4,184,004 to Pines et al. which is incorporated herein by reference in its entirety. The formula for UCARSIL® EPS is believed to be:

$$MD_xD'_yD''_zM \qquad I$$

wherein M, in each occurrence, is an end-capping unit of the formula $A_3SiO_{\frac{1}{2}}$ in which each A, individually, is a monovalent organic radical free of olefinic unsaturation, such as a monovalent hydrocarbon radical, preferably alkyl having from 1 to 13 carbon atoms, or a hydrocarbyloxy in which the hydrocarbyl moiety is free of olefinic unsaturation and is preferably alkoxy containing from 1 to 13 carbon atoms, or a hydroxyl-terminated radical which is bonded to the silicon through a 1 to 13 carbon chain; or A is hydroxyl bonded directly to the silicon atom; or the M groups can be—in one or both occurrences—alkoxy of 1 to about 13 carbon atoms.

In formula I above, D represents a unit of the formula $R_2SiO$ wherein R, in each occurrence, is a monovalent hydrocarbon radical free of acetylenic unsaturation. Illustrative of the monovalent radicals represented by R one can mention alkyl groups containing from 1 to 10 carbon atoms such as methyl, ethyl, propyl, butyl, isobutyl, amyl, hexyl, octyl, and decyl; alkenyl groups such as vinyl, allyl, butadienyl, 1-pentenyl and the like; aryl radicals, including fused ring structures, such as phenyl, p-phenyl-phenyl, naphthyl, anthryl, and the like; aralkyl radicals such as phenylmethyl and phenylcyclohexyl; alkaryl radicals such as tolyl, xylyl, ethylphenyl, alpha or beta-methylnaphthyl, and the like; and cycloalkyl radicals such as cyclopentyl, cyclohexyl, and cyclobutyl. Preferred R radicals are alkyl, with methyl being particularly preferred.

In formula I above, D' represents a unit of the formula RR'SiO wherein R has the same meaning as stated in the definition of D above, and R' is a polyoxyalkylene unit of the formula $$-C_nH_{2n}(OC_2H_4)_a(OC_3H_6)_bOR'' \qquad II$$

wherein n is an integer having an average value of from 1 to 8; R'' is hydrogen, acyl of 1 to 8 carbon atoms, or a monovalent hydrocarbon radical from 1 to 13 carbon atoms which is free from olefinic unsaturation; and a and b are integers such that the sum of a+b is at least 5 and can be up to about 200, and the quantity a/(a+b) has a value of from 1.0 to 0; preferably, a and b are integers such that the sum a+b has a value of at least 20 and the quantity a/(a+b) has a value from 0.25 to 1.0. In formula II above, the oxyethylene and oxypropylene moieties can be linked in a random chain or in a block chain such as a block chain structure of the AB or ABA type, or a chain having both blocked and random sections.

In formula I above, D'' is a unit of the formula RR'''SiO, wherein R has the same meaning as stated in the definition of D above, and R''' is a monovalent organic radical containing at least one vicinal epoxy group of the structure

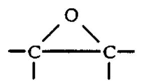

The monovalent organic radicals represented by R''' which contain epoxy groups are, exclusive of the oxirane oxygen necessarily present, preferably hydrocarbon radicals free of acetylenic unsaturation or containing in addition to carbon and hydrogen only ether or carbonyl oxygen. Such R''' radicals include 3,4-epoxycyclohexyl-6-methyl-3,4-epoxycyclohexyl; 3-4-epoxycyclohexyl-1-ethyl; 9,10-epoxyoctadecyl; gamma-glycidoxypropyl; p-(2,3-epoxybutyl)phenyl; and 3-(2,3-epoxybutyl)cyclohexyl. The vicinal epoxy group can be, but need not be, a terminal group of the R''' radical.

Because of the ready availability of precursors and the excellent results obtained using the final product, the preferred M and D units of formula I are, respectively, $(CH_3)_3SiO_{\frac{1}{2}}$ and $(CH_3)_2SIO$ and the preferred D' units are

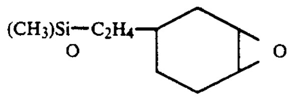

or

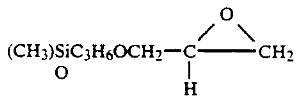

In formula I above x, y, and z are each integers and have the following average values:
x = 10 to 5,000 y=1 to x;
z=1 to 0.5x, provided that
Y+z≦0.75x
preferably
x=25 to 1,000,
y=1 to 0.5x provided that
z=1 to 0.25x
y+z≦0.5x
most preferably
x=50 to 300,
y=1 to 0.25x,
z=1 to 0.15x, provided that
y+z≦0.25x The surfactant in an aqueous solution may be applied to the substrate in any manner but is preferably applied to the polypropylene as it exits the orifice of the extruder.

The following examples further illustrate a preferred embodiment of the present invention. The examples should in no way be considered limiting, but are merely illustrative of the various features of the present invention.

EXAMPLE 1

A meltblown polypropylene wiper was produced by extruding Himont PF-011 98.5% polypropylene resin through a commercial melt blowing line. A 1% solution of wetting agent (i.e. 495 g $H_2O$/5 g wetting agent) was applied to the molten resin exiting the extruder at a rate of one pound of solution per pound of substrate produced. The fibers were then collected to form a nonwoven mat. The resulting fabric wiper had a basis weight of 2.5 oz./sq. yard and a per cent bond area ranging between 10 and 15%.

In order to compare the hydrophilic dissipation between the meltblown wiper of the present invention containing an organosilicone surfactant, and meltblown wipers containing other surfactants, a test procedure was conducted as follows:

1. An 8"×8" sample of the meltblown polypropylene fabric was cut out.
2. The sample was submerged in 600 ml. of tap water.
3. The sample was stirred in the water with a glass rod at 20 rotations.
4. The sample was run through an Atlas Wringer with 40 total pounds of weight on the rolls.
5. The sample was dried in a lab oven at 150° F. for 15 minutes.
6. The water absorbency rate (WAR) was measured in seconds per 0.1 ml. The entire procedure was then repeated with the same sample at reference step 2 for five additional cycles with the WAR measured for each cycle.
7. Steps 1-6 were then repeated a total of five times using different samples and the results were averaged.

The purpose of this rewetting durability procedure is to simulate repeated uses of the disposable wiper and to determine the number of cycles it takes for the surfactant to become completely dispersed from the substrate.

The results of these tests utilizing various surfactants on a meltblown polypropylene substrate are shown in Table I. These results present the water absorption rates (WAR) in sec/0.1 ml and are an average of the five test readings.

TABLE I

| | NUMBER OF CYCLES | | | | | |
|---|---|---|---|---|---|---|
| | 0 | 1 | 2 | 3 | 4 | 5 |
| | WAR (Sec./0.1 ml.) | | | | | |
| AEROSOL ® OT-75 | .79 | 95.6 | >180 | >180 | >180 | >180 |
| UCARSIL ® EPS | .28 | .55 | 7.12 | 12.5 | 25.2 | 57.8 |
| DOW CORNING X2-5176 | .27 | 20.2 | >180 | >180 | >180 | >180 |
| SURFYNOL ® 440 | .32 | >180 | >180 | >180 | >180 | >180 |
| SURFYNOL ® 465 | 2.3 | >180 | >180 | >180 | >180 | >180 |
| DOW CORNING X2-8239 | .27 | .37 | .66 | 6.5 | 6.4 | 135.4 |

AEROSOL is a registered trademark of American Cyanamid Company
UCARSIL is a registered trademark of Union Carbide Corporation
SURFYNOL is a registered trademark of Air Products and Chemicals, Inc.

UCARSIL ® EPS is the epoxcypolyoxyalkylene modified organosilicone utilized in a preferred embodiment of the present invention and is disclosed in U.S. Pat. No. 4,184,004 to Pines et al. AEROSOL ® OT is a dioctyl sodium sulfosuccinate in a mixture of solvents and is one of the wetting agents disclosed in U.S. Pat. No. 4,307,143 to Meitner for treating a meltblown synthetic substrate to produce a wiper. DOW CORNING X2-5176 is a silicone glycol copolymer surfactant. Surfynol ® 440 and 465 are both ethoxylated 2,4,7,9-tetramethyl-5-decyne-4,7,-diol. DOW CORNING X2-8239 is an organomethoxysiloxane.

The test results presented in Table I are graphically illustrated by the attached figure. The results of the tests indicate that the UCARSIL ® EPS and DOW CORNING X2-8239 surfactants incorporated into a meltblown polypropylene substrate provide in most cases improved and at least comparable initial absorption rates for water (0 cycle result) and provide greatly improved water absorption rates when the wiper is reused (cycles 1-5). Therefore, the wiper of the present invention achieves improved or at least comparable water absorption rates and greatly improved durable hydrophilicity compared to prior art wipers utilizing different wetting agents.

EXAMPLE 2

To determine the amount of UCARSIL EPS wetting agent applied to the polypropylene substrate (% by weight), the following test was conducted.

A 1% aqueous solution of UCARSIL EPS was applied to the melt blown polypropylene substrate as in Example 1. Three samples of the wiper material (each weighing approximately 10 grams) were soxhlet-extracted with 250 ml of distilled water. A control sample containing no wetting agent was also soxhlet-extracted with 250 ml of distilled water. The average amount of wetting agent extracted from the three samples was calculated to be 0.00517 grams per gram of fabric by utilizing an analysis of surface tension of the extracted liquid. The surface tension of the control sample was the same as distilled water. The results of this test indicate that the % by weight of the UCARSIL EPS wetting agent on the polypropylene substrate as produced in Example 1 was 0.517%.

Although the present invention has been described in connection with preferred embodiments, it is understood that modifications and variations may be resorted to without departing from the spirit and scope of the invention. Such modifications are considered to be within the purview and scope of the invention and the appended claims.

What is claimed is:

1. A wiper comprising:

a meltblown polypropylene substrate incorporating a functional organosilicone surfactant wetting agent capable of imparting durable hydrophilicity to said wiper.

2. The wiper of claim 1, wherein said meltblown polypropylene substrate has a basis weight ranging from 1.0 to 4.0 oz. per square yard.

3. The wiper of claim 1, wherein said meltblown polypropylene substrate contains from 0.1% to 2.0% by weight of said functional organosilicone surfactant wetting agent.

4. The wiper of claim 1, wherein said meltblown polypropylene substrate is formed from fibers having an average diameter ranging from 1 to 10 microns.

5. The wiper of claim 1, wherein said wetting agent comprises an aqueous solution of an organomethoxysiloxane.

6. The wiper of claim 1, wherein said wetting agent is an aqueous solution of an epoxypolyoxyalkylene modified organosilicone, wherein said wetting agent is present in an amount ranging from 0.75% to 3.0% by weight.

7. The wiper of claim 1, wherein said wetting agent is represented by the formula:

$$MD_xD'_yD''_zM$$

wherein M, in each occurrence, is an end-capping unit of the formula $A_3SiO_{1/2}$ in which A is a monovalent organic radical free of olefinic unsaturation or hydroxyl bonded directly to the silicon atom, or M is alkoxy of 1 to 13 carbon atoms; D is a unit of the formula $R_2SiO$ wherein R is a monovalent hydrocarbon radical free of acetylenic unsaturation; D' is a unit of the formula RR'SiO wherein R is a monovalent hydrocarbon radical free of acetylenic unsaturation and R' is a polyoxyalkylene unit of the formula $$C_nH_{2n}(OC_2H_4)_a(OC_3H_6)_bOR''$$

in which R'' is hydrogen, acyl of 1 to 8 carbon atoms or a monovalent hydrocarbon radical from 1 to 13 carbon atoms, n is an integer having an average value from 1 to 8, and a and b are integers such that the sum of a+b is from 5 to 200 and the quantity a/(a +b) is from 1 0 to 0; D'' is a unit of the formula RR'''SiO wherein R is a monovalent hydrocarbon radical free of acetylenic unsaturation and R''' is a monovalent organic radical containing at least one vicinal epoxy group; x is an integer having an average value of from 10 to 5,000; y is an integer having an average value from 1 to x; and z is an integer having an average value of from 1 to 0.5x; provided that the sum y+z is not greater than 0.75x.

8. The wiper of claim 7, wherein x has a value from 25 to 1,000; y has a value from 1 to 0.5x; and z has a value from 1 to 0.25x; provided that the sum y+z is not greater than 0.5x.

9. The wiper of claim 7, wherein x has a value from 50 to y has a value from 1 to 0.25x; and z has a value from 1 to 0.15x; provided that the sum y+z is not greater than 0.25x.

10. The wiper of claim 7, wherein a and b are integers such that the value of a/(a+b) is from 0.25 to 1.0.

11. The wiper of claim 7, wherein the sum a+b has a value of at least 20.

12. The wiper of claim 7, wherein D'' has the structure

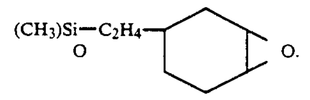

13. The wiper of claim 7, wherein D'' has the structure

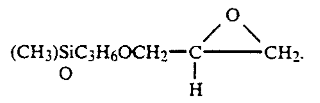

* * * * *

UNITED STATES PATENT AND TRADEMARK OFFICE

CERTIFICATE OF CORRECTION

PATENT NO. : 4,940,626

DATED : July 10, 1990

INVENTOR(S) : Rhodes, III et al.

It is certified that error appears in the above-identified patent and that said Letters Patent is hereby corrected as shown below:

Claim 7, column 8, line 10, "10" should be --1.0--

Claim 9, column 8, line 24, "to" (first occurrence) should be followed by --300;--

Signed and Sealed this

Twenty-first Day of May, 1991

*Attest:*

HARRY F. MANBECK, JR.

*Attesting Officer*

*Commissioner of Patents and Trademarks*